(12) United States Patent
Ano et al.

(10) Patent No.: US 7,321,560 B2
(45) Date of Patent: Jan. 22, 2008

(54) METHOD FOR DETECTING FAILURE LOCATION OF NETWORK IN THE INTERNET

(75) Inventors: Shigehiro Ano, Saitama (JP); Atsuo Tachibana, Saitama (JP); Atsushi Tagami, Saitama (JP); Toru Hasegawa, Saitama (JP)

(73) Assignee: KDDI Corporation, Tokyo (JP)

( * ) Notice: Subject to any disclaimer, the term of this patent is extended or adjusted under 35 U.S.C. 154(b) by 724 days.

(21) Appl. No.: 10/929,574

(22) Filed: Aug. 31, 2004

(65) Prior Publication Data

US 2005/0097387 A1     May 5, 2005

(30) Foreign Application Priority Data

Sep. 2, 2003   (JP)   ............................. 2003-310029
Aug. 13, 2004  (JP)   ............................. 2004-235897

(51) Int. Cl.
  *H04J 1/16*    (2006.01)
(52) U.S. Cl. .......................................... 370/242; 714/4
(58) Field of Classification Search ................ 370/216, 370/217, 218, 219, 220, 221, 222, 242, 251, 370/401, 404, 395.52; 714/4
See application file for complete search history.

(56) References Cited

U.S. PATENT DOCUMENTS 6,680,903 B1 *  1/2004  Moriguchi et al. ......... 370/216

7,266,758 B2 *  9/2007  Takeuchi et al. ............ 714/799

OTHER PUBLICATIONS

Jamshid Mahdavi, et al., "An Architecture for Large-Scale Internet Measurement", IEEE Communications Magazine, vol. 36, No. 8, Aug. 1998, pp. 48-54.
Toru Hasegawa, et al., "Programmable Remote Traffic Monitoring Method Using Active Network Approach", IFIP-TC6 Third International Working Conference, Proceeding of IWAN'01, Sep. 2001, pp. 49-64.

* cited by examiner

*Primary Examiner*—Chi Pham
*Assistant Examiner*—Alexander O. Boakye
(74) *Attorney, Agent, or Firm*—Oblon, Spivak, McClelland, Maier & Neustadt, P.C.

(57) ABSTRACT

The present invention detects a failure location of network in the Internet. A pair of networks consists of an access network and an Internet service provider network, and a route consists of a source pair of networks and a destination pair of networks. The quality information values are inputted to elements in a matrix that all pairs of networks are put in same order as rows (or columns) of source pairs of networks and columns (or rows) of destination pairs of networks. If inferior quality values in the matrix line up in the row (or column), a failure is determined in a destination (or a source) pair of networks in column side (or row side) corresponding to a row (or a column). If inferior quality values line up in a slanting direction, a failure is determined in a route between the Internet service provider networks indicated to the slanting direction.

4 Claims, 2 Drawing Sheets

METHOD FOR DETECTING FAILURE LOCATION OF NETWORK IN THE INTERNET

PRIORITY CLAIM

This application claims priority from Japanese patent application No. 2003-310029, filed on Sep. 2, 2003 and Japanese patent application No. 2004-235897, filed on Aug. 13, 2004, which is incorporated herein by reference.

BACKGROUND OF THE INVENTION

1. Field of the Invention

The present invention relates to a method for detecting a failure location of network in the Internet.

2. Description of the Related Art

The Internet consists of an IX (Internet exchange), a plurality of ISPNWs (Internet Service Provider NetWorks) and a plurality of ANWs (Access NetWorks). The ISPNWs are connected in star network from the IX, and the ISPNW is connected with a plurality of the ANWs. The ANW is a network facility such as an ADSL or an optical fiber, and terminals are directly connected with the ANWs. The ISPNW is a network for providing with a VoIP (Voice over IP) service or a picture streaming service. The Internet can have a plurality of routes because of including a plurality of the ISPNWs and a plurality of the ANWs.

A service provided by an ISP (Internet service provider) is influenced directly by communication quality in the ISPNW. However, the existing ISPNW is the best effort type service that does not ensure the communication quality. Therefore, a user wishes to select a route with good quality information, and intends to measure a communication quality on the route between the terminal and a speed-measuring server connected with the ISPNW. The terminal accesses to the speed-measuring server, and measures a transmission speed from data transfer size per unit time. The quality information is not only the transmission speed but also an establishment time of TCP connection. In addition, the user can know the routers on the route by using "traceroute" command in general.

V. Paxson, J. Mahdavi, A. Adams and M. Mathis, "An Architecture for Large-Scale Internet Measurement", IEEE Communications, vol. 36, No. 8, pp. 48-54, August, 1998.

T. Hasegawa, S. Ano, K. Nakao and F. Kubota, "Programmable Remote Traffic Monitoring Method Using Active Network Approach", Proceeding of IWAN' 01, pp. 49-64, September, 2001.

It is difficult to determine the network that cause an inferiority of quality information when a communication link has a plurality of routes as mentioned above. If it can determine a failure location of network, the user can select a route so that the failure position may be avoided.

BRIEF SUMMARY OF THE INVENTION

It is therefore an object of the present invention to provide a method for detecting a fault location of network in the Internet.

According to the present invention, a pair of networks consists of an access network and an Internet service provider network, and a route between terminals consists of a source pair of networks and a destination pair of networks, the method comprising the steps of:

measuring quality information between the terminals on round robin combination that all pairs of networks are made into a source side and a destination side;

inputting values indicating the quality information to elements in a matrix that all pairs of networks are put in same order as rows (or columns) corresponding to the source pairs of networks and columns (or rows) corresponding to destination pairs of networks; and determining that a failure is in a destination pair of networks in column side (or row side) corresponding to a row (or a column) if inferior quality values in the matrix line up in the row (or column), determining that a failure is in a source pair of networks in row side (or column side) corresponding to a column (or a row) if inferior quality values in the matrix line up in the column (or row), and determining that a failure is in a backbone route between the Internet service provider networks indicated to a slanting direction if inferior quality values in the matrix line up in the slanting direction.

It is preferred that the pair of networks corresponds to a fixed IP address, and the quality information is a transmission speed and/or an establishment time of TCP connection.

Another object of the present invention is to provide a method for using a computer to facilitate a transaction for detecting a failure location of network in the Internet.

According to the present invention, a pair of networks consists of an access network and an Internet service provider network, and a route between terminals consists of a source pair of networks and a destination pair of networks, the method comprising the steps of:

measuring quality information between the terminals on round robin combination that all pairs of networks are made into a source side and a destination side;

inputting values indicating the quality information to elements in a matrix that all pairs of networks are put in same order as rows (or columns) corresponding to the source pairs of networks and columns (or rows) corresponding to destination pairs of networks; and determining that a failure is in a destination pair of networks in column side (or row side) corresponding to a row (or a column) if inferior quality values in the matrix line up in the row (or column), determining that a failure is in a source pair of networks in row side (or column side) corresponding to a column (or a row) if inferior quality values in the matrix line up in the column (or row), and determining that a failure is in a backbone route between the Internet service provider networks indicated to a slanting direction if inferior quality values in the matrix line up in the slanting direction.

It is preferred that the pair of networks corresponds to a fixed IP address, and the quality information is a transmission speed and/or an establishment time of TCP connection.

Further objects and advantages of the present invention will be apparent from the following description of the preferred embodiments of the invention as illustrated in the accompanying drawings.

DETAILED DESCRIPTION OF THE INVENTION

Figure 1:
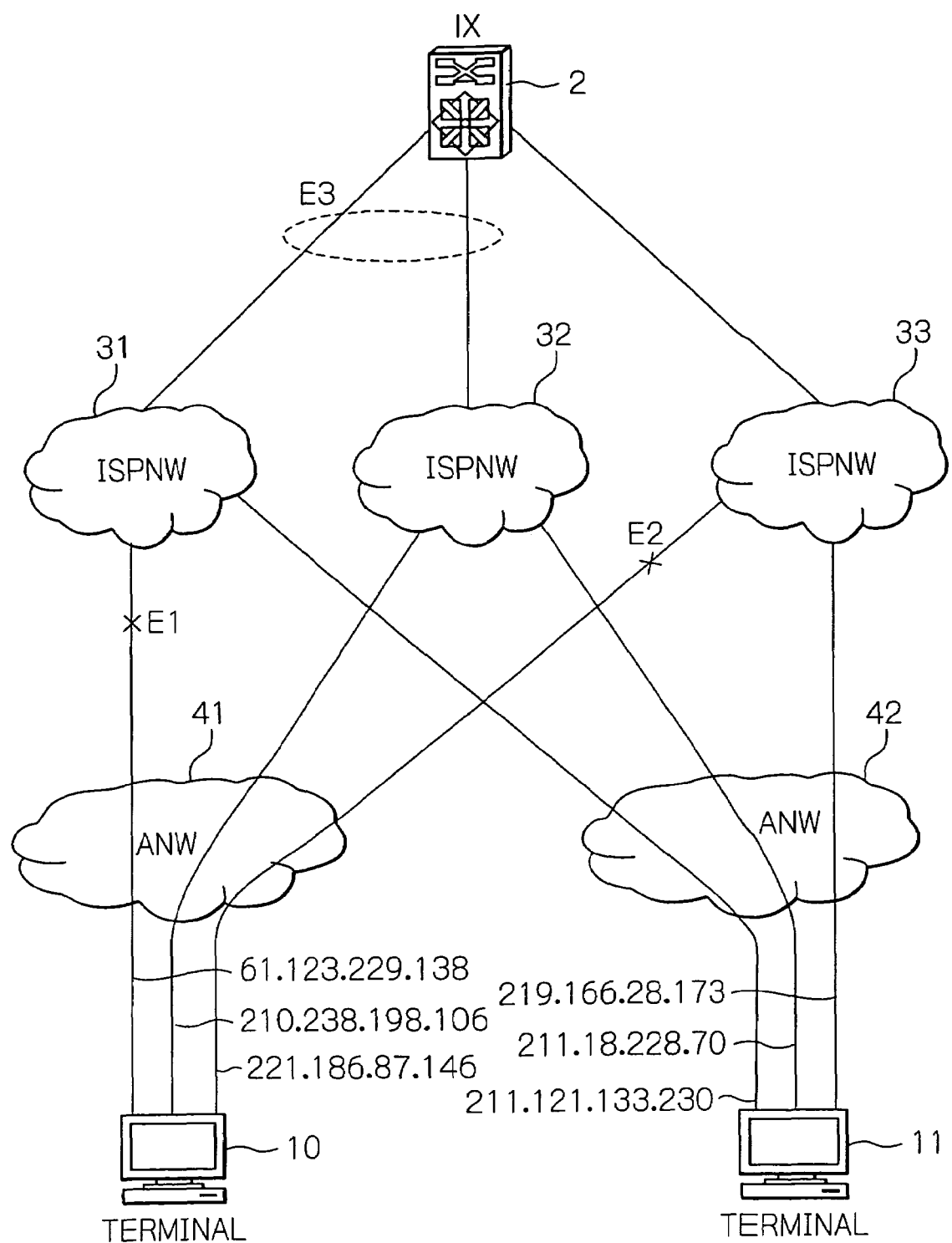
FIG. 1 illustrates a system configuration in a multi-homed environment according to the present invention.

FIG. 1 illustrates a system configuration in a multi-homed environment according to the present invention.

The multi-homed environment in FIG. 1 consists of IX 2, ISPNWs 31-33 and ANWs 41 and 42. The ISPNWs 31-33 respectively are connected to IX2 in star network, and are interconnected to the ANWs 41 and 42. An operator for a terminal 10 or 11 makes a contract for a pair of networks with one ANW and one ISPNW, and obtains one fixed IP address. In addition, the operator can make a contract for a plurality of pairs of networks with other ANW and other ISPNW, and can obtain a plurality of fixed IP addresses. That is, the terminal can have the fixed IP address for each pair of networks with ANW and ISPNW. Thereby, it is provided with the multi-homed environment that can establish a plurality of routes to one destination.

As shown in FIG. 1, the terminal 10 is connected with the ANW 41, and has three fixed IP addresses corresponding to the pairs of networks with the ANW 41 and the ISPNWs 31-33.

ANW 41 <-> ISPNW 31 IP address 061.123.229.138
ANW 41 <-> ISPNW 32 IP address 210.238.198.106
ANW 41 <-> ISPNW 33 IP address 221.186.087.146

On the other hand, the terminal 11 is connected with an ANW 42, and has three fixed IP addresses corresponding to the pairs of networks with the ANW 42 and the ISPNWs 31-33.

ANW 42 <-> ISPNW 31 IP address 211.121.133.230
ANW 42 <-> ISPNW 32 IP address 211.018.228.070
ANW 42 <-> ISPNW 33 IP address 219.166.028.173

In the multi-homed environment, the operator wishes to select a route with high quality, that is, a pair of networks with high transmission speed. Therefore, if the transmission speed is measured for each fixed IP address assigned to the terminal, the operator can select the fixed IP address of the highest transmission speed.

Table (Matrix) 1 arranges source addresses (source pair of networks) in row, and arranges destination addresses (destination pair of networks) in column. In the Table 1, it is necessary that a sequence of the source pairs of networks in row is the same as a sequence of the destination pairs of networks in column.

33 -> ANW42 -> terminal 11. According to FIG. 1, the IX 2 exists between ISPNW 32 and ISPNW 33.

Then, a transmission speed is measured for each element in Table 1. Although TCP throughput is used as measured value thereinafter, an establishment time of TCP connection or other IP quality parameters (delay, delay fluctuation, packet loss probability, retransmission rate of TCP segment, etc.) may be used.

As one example, it can use "ttcp" command by UNIX.
(Command inputted in a source terminal)
ttcp -t 210.238.198.106[destination address] -s
(Command inputted in a destination terminal)
ttcp -r -s The source terminal can obtain the following output results, for example.
ttcp-t: buflen=8192, nbuf=2048, align=16384/0, port=5001
    tcp->210.238.198.106
ttcp-t: 16777216 bytes in 4.11 real seconds=3983.79 KB/sec
    +++
ttcp-t: 2048 I/O calls, msec/call=2.06, calls/sec=497.97
ttcp-t: 0.0user 0.0sys 0:04real 0% 0i+0d 0maxrss 0+2pf 0+0csw Thereby, the operator can know buffer length (buflen) 8192 bytes, transmitting buffer numbers 2048, port number 5001, destination address 210.238.198.106, data transfer size 16,777,216 bytes per 4.1 seconds, and transmission-speed 3.98 Mbytes per second.

On the other hand, the destination terminal can obtain the following output results, for example.
ttcp-r: buflen=8192, nbuf=2048, align=16384/0, port=5001
    tcp
ttcp-r: 16777216 bytes in 4.12 real seconds=3976.23 KB/sec
    +++
ttcp-r: 12643 I/O calls, msec/call=0.33, calls/sec=3068.32
ttcp-r: 0.0user 0.0sys 0:04real 2% 0i+0d 0maxrss 0+2pf 0+0csw Thereby, the operator can know buffer length (buflen) 8192 bytes, transmitting buffer numbers 2048, port number 5001, data transfer size 16,777,216 bytes per 4.12 seconds, and transmission-speed 3.97 Mbytes per second.

In addition, FIG. 1 shows that the IX 2 is connected among the ISPNWs. Of course, other ISPNWs may be connected among them.

TABLE 1

| destination address | source address | | | | | |
|---|---|---|---|---|---|---|
| | (ANW42, ISP31) 211.121.133.230 | (ANW41, ISP31) 061.123.229.138 | (ANW41, ISP32) 210.238.198.106 | (ANW42, ISP32) 211.018.228.070 | (ANW41, ISP33) 221.186.087.146 | (ANW42, ISP33) 219.166.028.173 |
| (ANW41, ISP31) 061.123.229.138 | | | | | | |
| (ANW42, ISP31) 211.121.133.230 | | ※1 | | | | |
| (ANW41, ISP32) 210.238.198.106 | | | | | | |
| (ANW42, ISP32) 211.018.228.070 | | | | | | |
| (ANW41, ISP33) 221.186.087.146 | | | | | | |
| (ANW42, ISP33) 219.166.028.173 | | | ※2 | | | |

For example, *1 "source address 061.123.229.138 and destination address 221.121.133.230" means a route with the terminal 10 -> ANW 41 -> ISPNW 31 -> ANW 42 -> terminal 11. Moreover, *2 "source address 210.238.198.106 and destination address 221.186.087.146" means a route with terminal 10 -> ANW 41->ISPNW 32 -> . . . -> ISPNW The measured transmission speed is inputted into each element in Table 1. For example, when the transmission speed is lower than 6 Mbytes/sec, it is determined that the quality information is inferior.

Table 2 was measured at time t1.

TABLE 2 time t1

| destination address | source address (ANW41, ISP31) 061.123.229.138 | (ANW42, ISP31) 211.121.133.230 | (ANW41, ISP32) 210.238.198.106 | (ANW42, ISP32) 211.018.228.070 | (ANW41, ISP33) 221.186.087.146 | (ANW42, ISP33) 219.166.028.173 |
|---|---|---|---|---|---|---|
| (ANW41, ISP31) 061.123.229.138 |  | 14.55 |  | 15.34 |  | 14.89 |
| (ANW42, ISP31) 211.121.133.230 | 4.56 |  | 15.25 |  | 14.99 |  |
| (ANW41, ISP32) 210.238.198.106 |  | 15.33 |  | 14.97 |  | 14.77 |
| (ANW42, ISP32) 211.018.228.070 | 4.44 |  | 14.88 |  | 14.95 |  |
| (ANW41, ISP33) 221.186.087.146 |  | 15.87 |  | 15.00 |  | 15.05 |
| (ANW42, ISP33) 219.166.028.173 | 4.43 |  | 14.67 |  | 14.79 |  |

Table 3 was measured at time t2.

TABLE 3 time t2

| destination address | source address (ANW41, ISP31) 061.123.229.138 | (ANW42, ISP31) 211.121.133.230 | (ANW41, ISP32) 210.238.198.106 | (ANW42, ISP32) 211.018.228.070 | (ANW41, ISP33) 221.186.087.146 | (ANW42, ISP33) 219.166.028.173 |
|---|---|---|---|---|---|---|
| (ANW41, ISP31) 061.123.229.138 |  | 15.89 |  | 5.22 |  | 14.79 |
| (ANW42, ISP31) 211.121.133.230 | 15.54 |  | 5.26 |  | 15.23 |  |
| (ANW41, ISP32) 210.238.198.106 |  | 5.32 |  | 15.90 |  | 15.83 |
| (ANW42, ISP32) 211.018.228.070 | 5.42 |  | 15.80 |  | 15.23 |  |
| (ANW41, ISP33) 221.186.087.146 |  | 15.99 |  | 15.44 |  | 15.00 |
| (ANW42, ISP33) 219.166.028.173 | 15.40 |  | 15.64 |  | 15.33 |  |

Table 4 was measured at time t3.

TABLE 4 time t3

| destination address | source address (ANW41, ISP31) 061.123.229.138 | (ANW42, ISP31) 211.121.133.230 | (ANW41, ISP32) 210.238.198.106 | (ANW42, ISP32) 211.018.228.070 | (ANW41, ISP33) 221.186.087.146 | (ANW42, ISP33) 219.166.028.173 |
|---|---|---|---|---|---|---|
| (ANW41, ISP31) 061.123.229.138 |  | 14.34 |  | 15.29 |  | 14.92 |
| (ANW42, ISP31) 211.121.133.230 | 14.53 |  | 14.22 |  | 14.87 |  |
| (ANW41, ISP32) 210.238.198.106 |  | 14.31 |  | 14.00 |  | 14.31 |
| (ANW42, ISP32) 211.018.228.070 | 14.21 |  | 14.59 |  | 14.68 |  |
| (ANW41, ISP33) 221.186.087.146 |  | 5.00 |  | 5.32 |  | 5.82 |
| (ANW42, ISP33) 219.166.028.173 | 14.44 |  | 14.36 |  | 14.89 |  |

According to the present invention, it can determine the failure location of three patterns by Tables 2-4. FIG. 1 shows three failure locations E1, E2 and E3.

(E1) If inferior quality values in Table 2 line up in column, it can be detected that a failure is in the source pair of networks with ANW 41 and ISPNW 31 of row side corresponding to the column in Table 2.

(E2) If inferior quality values in Table 4 line up in row, it can be detected that a failure is in the destination pair of networks with ANW 41 and ISPNW 33 of column side corresponding to the row in Table 4.

(E3) If inferior quality values in Table 3 line up in a slanting direction, it can be detected that a failure is in the backbone route between ISPNWs 31 and 32 (via IX) indicated to the slanting direction in Table 3.

Tables 5-7 arrange the pairs of networks of Tables 2-4 in order in a different sequence. Even if the arrangement of the pairs of networks is modified, it can use the same detecting method as mentioned above. However, in the Tables, it is necessary that a sequence of the source pairs of networks in row is the same as a sequence of the destination pairs of networks in column.

Table 5 corresponds to Table 2.

TABLE 5

| | time t1 | | | | | |
|---|---|---|---|---|---|---|
| | source address | | | | | |
| destination address | (ANW41, ISP31) 061.123.229.138 | (ANW41, ISP32) 210.238.198.106 | (ANW41, ISP33) 221.186.087.146 | (ANW42, ISP31) 211.121.133.230 | (ANW42, ISP32) 211.018.228.070 | (ANW42, ISP33) 219.166.028.173 |
| (ANW41, ISP31) 061.123.229.138 | | | | 14.55 | 15.34 | 14.89 |
| (ANW41, ISP32) 210.238.198.106 | | | | 15.33 | 14.97 | 14.77 |
| (ANW41, ISP33) 221.186.087.146 | | | | 15.87 | 15.00 | 15.05 |
| (ANW42, ISP31) 211.121.133.230 | 4.56 | 15.25 | 14.99 | | | |
| (ANW42, ISP32) 211.018.228.070 | 4.44 | 14.88 | 14.95 | | | |
| (ANW42, ISP33) 219.166.028.173 | 4.48 | 14.67 | 14.79 | | | |

Table 6 corresponds to Table 3.

TABLE 6

| | time t2 | | | | | |
|---|---|---|---|---|---|---|
| | source address | | | | | |
| destination address | (ANW41, ISP31) 061.123.229.138 | (ANW41, ISP32) 210.238.198.106 | (ANW41, ISP33) 221.186.087.146 | (ANW42, ISP31) 211.121.133.230 | (ANW42, ISP32) 211.018.228.070 | (ANW42, ISP33) 219.166.028.173 |
| (ANW41, ISP31) 061.123.229.138 | | | | 15.89 | 5.22 | 14.79 |
| (ANW41, ISP32) 210.238.198.106 | | | | 5.32 | 15.90 | 15.83 |
| (ANW41, ISP33) 221.186.087.146 | | | | 15.99 | 15.44 | 15.00 |
| (ANW42, ISP31) 211.121.133.230 | 15.54 | 5.25 | 15.23 | | | |
| (ANW42, ISP32) 211.018.228.070 | 5.42 | 15.80 | 15.23 | | | |
| (ANW42, ISP33) 219.166.028.173 | 15.40 | 15.64 | 15.33 | | | |

Table 7 corresponds to Table 4.

TABLE 7

| | time t3 | | | | | |
|---|---|---|---|---|---|---|
| | source address | | | | | |
| destination address | (ANW41, ISP31) 061.123.229.138 | (ANW41, ISP32) 210.238.198.106 | (ANW41, ISP33) 221.186.087.146 | (ANW42, ISP31) 211.121.133.230 | (ANW42, ISP32) 211.018.228.070 | (ANW42, ISP33) 219.166.028.173 |
| (ANW41, ISP31) 061.123.229.138 | | | | 14.34 | 15.29 | 14.92 |

TABLE 7-continued time t3

| destination address | source address | | | | | |
|---|---|---|---|---|---|---|
| | (ANW41, ISP31) 061.123.229.138 | (ANW41, ISP32) 210.238.198.106 | (ANW41, ISP33) 221.186.087.146 | (ANW42, ISP31) 211.121.133.230 | (ANW42, ISP32) 211.018.228.070 | (ANW42, ISP33) 219.166.028.173 |
| (ANW41, ISP32) 210.238.198.106 | | | | 14.31 | 14.00 | 14.31 |
| (ANW41, ISP33) 221.186.087.146 | | | | 5.00 | 5.82 | 5.82 |
| (ANW42, ISP31) 211.121.133.230 | 14.53 | 14.22 | 14.87 | | | |
| (ANW42, ISP32) 211.018.228.070 | 14.21 | 14.59 | 14.68 | | | |
| (ANW42, ISP33) 219.166.028.173 | 14.44 | 14.36 | 14.89 | | | |

Tables 5-7 can detect failure locations of three patterns as well as Tables 2-4.

(E1) If inferior quality values in Table 5 line up in column, it can be detected that a failure is in the source pair of networks with ANW 41 and ISPNW 31 of row side corresponding to the column in Table 5.

(E2) If inferior quality values in Table 7 line up in row, it can be detected that a failure is in the destination pair of networks with ANW 41 and ISPNW 33 of column side corresponding to the row in Table 7.

(E3) If inferior quality values in Table 6 line up in a slanting direction, it can be detected that a failure is in the backbone route between ISPNWs 31 and 32 (via IX) indicated to the slanting direction in Table 6.

Figure 2:
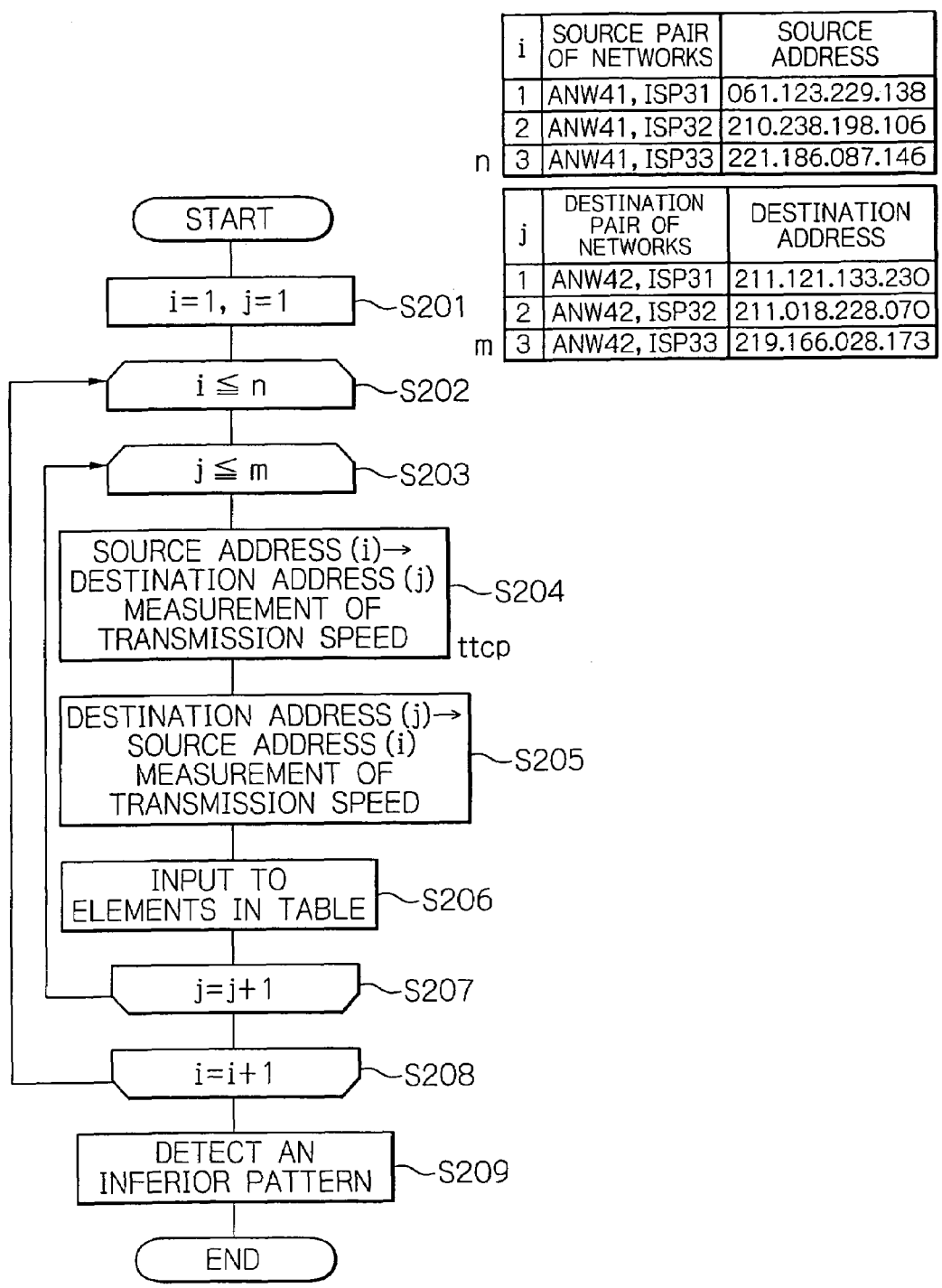
FIG. 2 illustrates a flowchart for obtaining transmission speed for a matrix according to the present invention.

FIGS. 2 illustrates a flowchart for obtaining transmission speed for the Table (Matrix) according to the present invention.

It assigns i=1–n to the fixed IP address of the source pair of networks, and assigns j=1–m to the fixed IP address of the destination pair of networks.

(S201) When measuring is started, variables i and j are assigned to 1.

(S204) The transmission speed from the source address (i) to the destination address (j) is measured. For example, "ttcp" command as mentioned above is used.

(S205) As the reverse direction, the transmission speed from the destination address (j) to the source address (i) is measured.

(S206) The measured value is inputted into the elements in the Table.

(S207) The j is incremented, and the series of transaction from S204 to S206 are repeated until j=m.

(S208) The i is incremented, and the series of transaction S202 to S207 are repeated until i=n.

(S209) The inferior patterns are detected from the completed matrix.

As the measuring does not affect a throughput, each transmission speed must not be measured simultaneously. Therefore, a period ΔT for detecting the inferior pattern shown with Tables needs to satisfy the following equation.

$$\Delta T > (a*2+\beta+\gamma)*m*n+a*(m*n-1)+X$$

Here, "a" means a time for measuring transmission speed (S204 or S205), "β" means a time for changing measurements of transmission-speed, "γ" is a time for inputting the measured values in Table, and "X" means a time for detecting the inferior patterns (S209).

In the formula mentioned above, the measuring time "a" of transmission speed needs to be determined by a time (about 30 seconds or more) that can maintain a precision of measurement throughput. On the one hand, an upper limit of "a" (about 1 minute-about 10 minutes) needs to be determined so that the period ΔT (about 1 minute-about 10 minutes) for detecting the inferior patterns is sufficiently shorter than a long congestion duration (about 1 hour-about several hours) in the network.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A method for detecting a failure location of network in the Internet, a pair of networks consists of an access network and an Internet service provider network, and a route between terminals consists of a source pair of networks and a destination pair of networks, said method comprising the steps of:

measuring quality information between said terminals on round robin combination that all pairs of networks are made into a source side and a destination side;

inputting values indicating said quality information to elements in a matrix that all pairs of networks are put in same order as rows or columns corresponding to said source pairs of networks and columns or rows corresponding to destination pairs of networks; and determining that a failure is in a destination pair of networks in column side or in row side corresponding to a row or a column if inferior quality values in said matrix line up in said row or column, determining that a failure is in a source pair of networks in row side or in column side corresponding to a column or a row if inferior quality values in said matrix line up in said column or row, and determining that a failure is in a backbone route between said Internet service provider networks indicated to a slanting direction if inferior quality values in said matrix line up in said slanting direction.

2. The method as claimed in claim 1, wherein said pair of networks corresponds to a fixed IP address, and said quality information is a transmission speed and/or an establishment time of TCP connection.

3. A method for using a computer to facilitate a transaction for detecting a failure location of network in the Internet, a pair of networks consists of an access network and an Internet service provider network, and a route between terminals consists of a source pair of networks and a destination pair of networks, said method comprising the steps of:

measuring quality information between said terminals on round robin combination that all pairs of networks are made into a source side and a destination side;

inputting values indicating said quality information to elements in a matrix that all pairs of networks are put in same order as rows or columns corresponding to said source pairs of networks and columns or rows corresponding to destination pairs of networks; and determining that a failure is in a destination pair of networks in column side or in row side corresponding to a row or a column if inferior quality values in said matrix line up in said row or column, determining that a failure is in a source pair of networks in row side or column side corresponding to a column or a row if inferior quality values in said matrix line up in said column or row, and determining that a failure is in a backbone route between said Internet service provider networks indicated to a slanting direction if inferior quality values in said matrix line up in said slanting direction.

4. The method as claimed in claim 3, wherein said pair of networks corresponds to a fixed IP address, and said quality information is a transmission speed and/or an establishment time of TCP connection.

* * * * *